Figure 1:
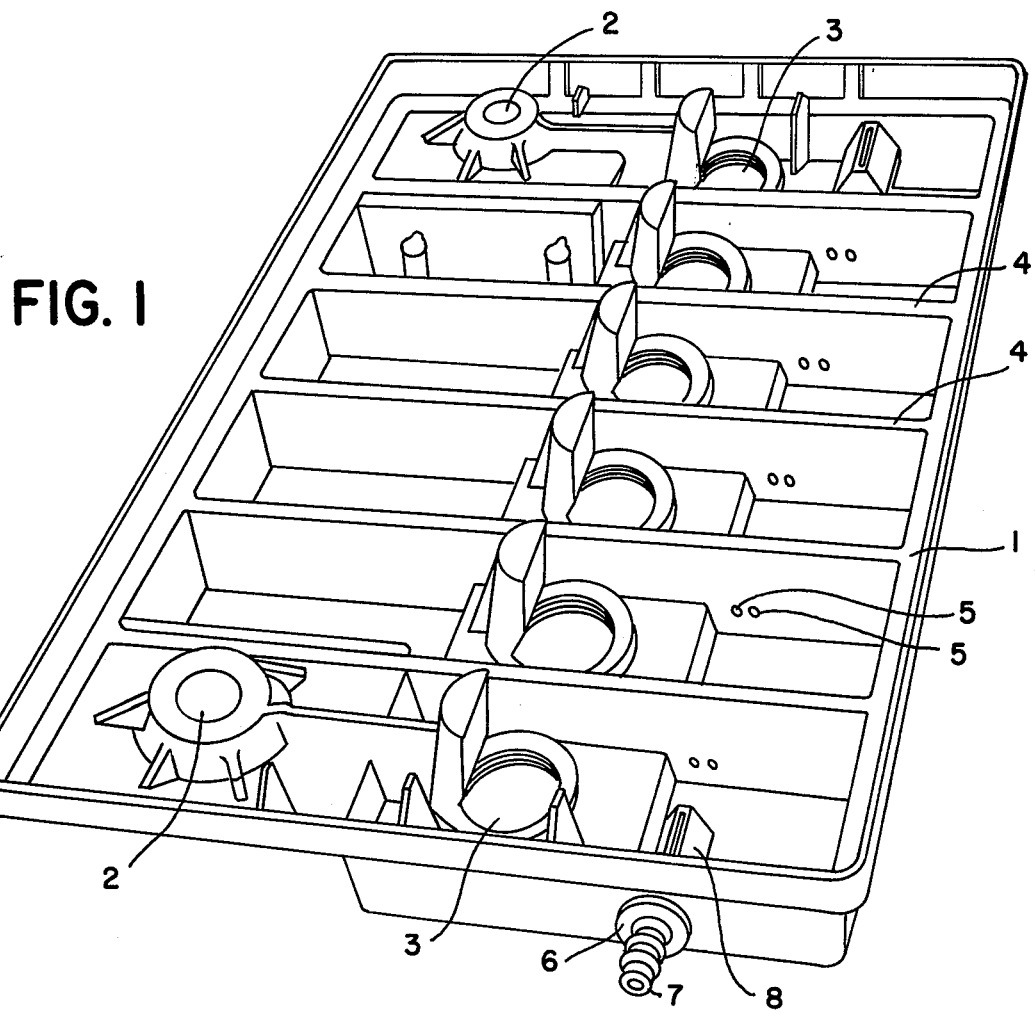

United States Patent [19]

Lindenberg et al.

[11] 4,107,398

[45] Aug. 15, 1978

[54] GAS REMOVAL MEANS FOR STORAGE BATTERIES

[75] Inventors: Hans-Georg Lindenberg; Hans-Joachim Golz, both of Hanover, Fed. Rep. of Germany

[73] Assignee: Varta Batterie Aktiengesellschaft, Fed. Rep. of Germany

[21] Appl. No.: 737,619

[22] Filed: Nov. 1, 1976

[30] Foreign Application Priority Data

Nov. 27, 1975 [DE] Fed. Rep. of Germany ... 7537737[U]

[51] Int. Cl.² .......................................... H01M 2/12
[52] U.S. Cl. ........................................ 429/88; 429/175
[58] Field of Search ............... 429/73, 82, 88, 71, 429/72, 175, 176

[56] References Cited

U.S. PATENT DOCUMENTS

| | | | |
|---|---|---|---|
| 1,380,770 | 6/1921 | Carpenter | 429/73 |
| 1,920,261 | 8/1933 | Lavender | 429/83 |
| 2,662,108 | 12/1953 | Coates | 429/82 |
| 3,282,740 | 11/1966 | Wylie | 429/88 |
| 3,329,531 | 7/1967 | Hennen | 429/88 |
| 3,546,023 | 12/1966 | Halter et al. | 429/82 |

FOREIGN PATENT DOCUMENTS

1,110,032  4/1968  United Kingdom.

*Primary Examiner*—Donald L. Walton
*Attorney, Agent, or Firm*—Weiser, Stapler & Spivak

[57] ABSTRACT

Apertures in internal partitions provide gas passages. A separator chamber with narrow liquid return slot leads to a gas outlet hose coupling.

6 Claims, 2 Drawing Figures

U.S. Patent   Aug. 15, 1978   4,107,398

GAS REMOVAL MEANS FOR STORAGE BATTERIES

The improvement relates to an electric storage battery and particularly to a starter battery having at least two cells positioned within a block casing. The individual cells are closed by tight closure plugs and a central gas removal system is provided.

In using storage batteries, gases evolve within the cells during the various operating conditions, and particularly during charging. These must either be recombined within the storage battery or evacuated from it.

In lead starter batteries it has heretofore been the practice to use the individual cell closure plug as the gas venting plug. Such gas venting plugs must be capable of closing off the respective cells in such a way that entrained electrolyte particles are prevented from escaping from the cell. This function is particularly essential when the storage battery is used in vehicles which are subject to severe shaking movements, in which the danger of entrainment of electrolyte particles is exceptionally pronounced. Such closure plugs are therefore frequently constructed in such a way that separate paths are provided for admission of the gases from the cell into the interior of the plug, on the one hand, and for the discharge of the collected or condensed electrolyte liquid from the interior of the plug back into the cell, on the other hand.

In some cases, on the other hand, free escape of the gas from the individual cells of the storage battery is to be precluded, in which cases central gas removal is provided for. Such central gas removal may be provided, for example, by a system of pipes which connects the individual closure plugs of the cells with each other. However, such piping systems positioned upon the storage battery have the specific disadvantage of increasing the structural height of the storage battery.

It is also known to position the central gas removal system inside the storage battery lid. In that case, the lid is provided with built-in ducts, terminating at a hose coupling through which the charging gases can be ducted to any desired location. Such gas ducting systems built into the lid lead in particular to complicated lid configurations and therefore also to high costs in the manufacture of the lids.

From British Pat. No. 1,110,032, it is further known to achieve pressure equalization among all of the cells of the storage battery by providing passages in the cell separating walls.

It is an object of the present invention to provide a central gas removal system for multicell storage batteries, which is easy to manufacture and does not require the use of special lids or closure plugs.

It is another object to provide such gas removal which functions reliably even in vehicular use, where the battery is subjected to strong vibrations.

These and other objects which will appear are achieved in accordance with the present improvement by providing at least one aperture in each cell separating wall of the block casing and/or the block lid. Each such aperture has a diameter of about 1.5 to 2 mm. An end cell of the storage battery is provided with a hose coupling for the removal of the gases evolved in all of the cells.

It is particularly important that the apertures in the cell separating walls have optimal open cross-section. Preferably, and particularly for manufacturing reasons, this aperture is round in shape and has a diameter of between 1.5 and 2.0 mm. It may also be desirable, for larger batteries, to provide a plurality of such apertures in the cell separating wall between two adjacent cells.

Apertures which are too large, between the adjacent cells of the storage battery, are particularly undesirable when the storage battery is subject to movements and vibration. This is because exchange of the electrolyte quantities in adjacent cells can take place and this can lead to undesired rise of the electrolyte level in individual cells. In particular, if a high proportion of electrolyte is entrained through the apertures, an increase in the electrolyte level of the end cells can take place.

Connecting apertures which are too small between adjacent cells cause difficulties during maximum gas evolution because high gas velocities are then encountered which also lead to entrainment of excessively high liquid fractions. Moreover, when very small connecting apertures between cells are used, solid particles which may be entrained can cause plugging which, in turn, can lead to excessive pressure buildup in any cell which is thereby hermetically closed.

A further significant feature of the improvement is that entrainment of liquid from the last cell, the one which is provided with a hose coupling, is precluded. To that end a liquid separator element is used which has separate paths for gas and liquid and which provides substantial return of the liquid droplets present in the gas. In particular, such a liquid separator may take the form of a chamber, whose interior is subdivided by separating walls into multiple chambers. On their sides facing the electrolyte, these are provided with a slot whose dimensions are such that a liquid level of about 1 to 2 mm in height always remains in the separator. On the other hand, through this same narrow slot in the bottom of the separator, larger quantities of separated electrolyte can flow downwardly into the cell. It is particularly desirable to leave the top of the separating chamber or liquid separator open and to form on that side a narrow slot between it and the underside of the lid. This narrow slot then also serves to separate the gases, which escape with relatively high velocity through the slot, from liquid droplets. It is also possible, in place of a slot between separating chamber and lid underside, to attach the separating chamber directly to the lid, e.g. by gluing it to the lid. However, the separating chamber should then have a defined opening which permits gases to reach the interior of the liquid separator.

Figure 2:
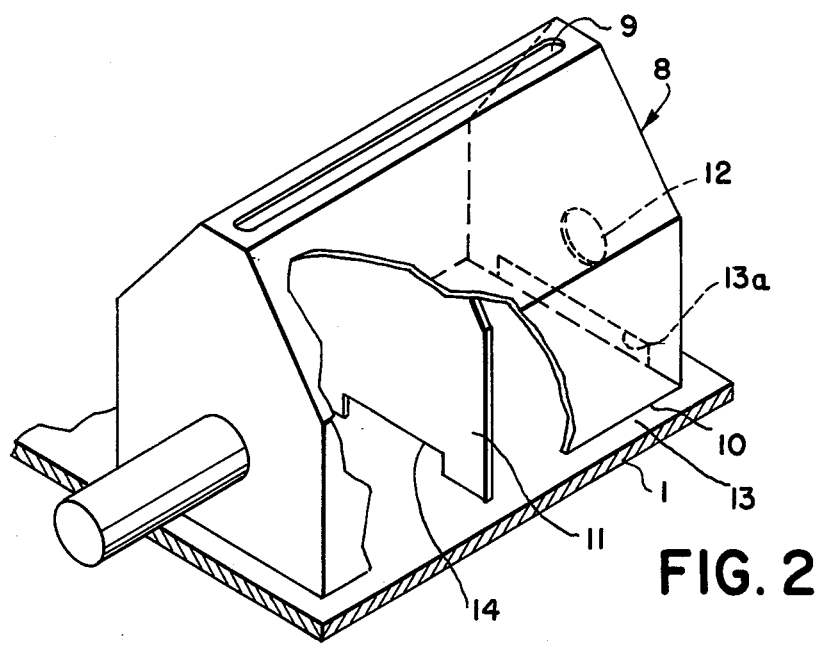

For further details reference is made to the discussion which follows in the light of the accompanying drawings, wherein FIG. 1 is a perspective view of a cell block lid embodying the present improvement, and FIG. 2 is an enlarged view, also in perspective, of the liquid separator mounted within the lid of FIG. 1.

The lid 1 illustrated in FIGS. 1 and 2 is a conventional block lid for a starter battery having, in the example illustrated, six cells. It should be noted that this lid is shown in FIGS. 1 and 2 inverted from the position which it would occupy in normal use on a battery. In other words, the side of the lid shown on the top in FIGS. 1 and 2 is actually the underside of the lid in normal useage. Block lid 1 has apertures 2 for the battery terminal posts, as well as apertures 3 which are to be closed by means of tightly closing closure plugs in a storage battery embodying the present improvement. In the cell separator walls 4, two apertures 5 per wall are provided, preferably with circular cross-section and having a diameter of about 1.5 to 2 mm. In the end cell, a corresponding gas outlet aperture is connected via sealing gland 6 to a hose coupling element 7 and has connected to it a liquid separator 8 shown in greater detail in FIG. 2.

This liquid separator 8 is a chamber which preferably has a triangular or trapezoidal cross-section. The side which, in the complete storage battery, faces the electrolyte is provided with a narrow slot 9. The chamber is open at its top and is mounted in such a manner that its upper edge 10 is spaced from the underside of lid 1 and forms with that underside a defined gap 13 for admission of the charging gases.

The slot 9 in the lower side of the liquid separator device is so dimensioned that, in normal use, it is closed off by a liquid film. On the other hand, during increased liquid separation, electrolyte can flow back through this slot into the electrolyte chamber itself. The liquid separator itself has its interior subdivided by one or more internal partitions 11 into a plurality of chambers, e.g. two. These, in turn, communicate with each other in the direction of gas flow, e.g. through a recess 14 which may, if desired, even extend the full width of partition 11. This subdivision of the inner chambers substantially improves the liquid separation.

As an alternative, it is possible to position upper edge 10 up against the underside of lid 1, thereby closing the chamber formed by liquid separator 8. In that case, there may be provided a gas inlet aperture to the chamber, in the form of aperture 12 or recess 13a, shown in broken lines in FIG. 2.

We claim:

1. A housing for a block of cells which together constitute a storage battery, the housing providing for the block of cells a casing and a lid, at least one of which has internal partitions between the adjacent ones of the cells, the housing being characterized by at least one aperture in each internal partition for the passage between cells of gas evolved in the storage battery, and coupling means in the outer wall of an end cell for connecting hose means for evacuating the gas evolved in all the cells, each aperture having a diameter of about 1.5 to 2.0 mm. that being such that evolved gas passage can readily take place without entraining excessive liquid fractions, whereas exchange of electrolyte in substantial quantities between cells is impeded, the coupling means having a liquid separator means connected ahead of it, the liquid separator means including a chamber having a sloping bottom with a slot through which liquid entrained in the gases and separated from them in the chamber can flow back downward into the battery, the slot being so dimensioned that during normal battery operation it retains a layer of the liquid which closes the slot, while permitting liquid to flow downwardly through the slot when additional liquid accumulates during greater-than-normal gas evolution.

2. The housing of claim 1 wherein each aperture has a generally circular shape.

3. The housing of claim 1 wherein the chamber is subdivided into a plurality of smaller chambers arranged serially in the direction of gas flow.

4. The housing of claim 1 wherein the chamber is positioned just below the top of the housing lid, and a gap is provided between the chamber and the underside of the lid for the admission of gas into the chamber.

5. The housing of claim 1, wherein the chamber has its top joined to the underside of the housing lid and an aperture is provided in the side of the chamber for the admission of gas into the chamber.

6. The housing of claim 1 wherein each aperture is in partitions formed as part of the housing lid.

* * * * *